United States Patent
Keur et al.

(10) Patent No.: US 6,278,816 B1
(45) Date of Patent: Aug. 21, 2001

(54) NOISE REDUCTION TECHNIQUE FOR CLADDING PUMPED OPTICAL AMPLIFIERS

(75) Inventors: Michael R. Keur, Des Plaines; James H. Fisher, Batavia; Douglas W. Anthon, Wheaton; Kevin L. Sweeney, Naperville, all of IL (US)

(73) Assignee: Scientific-Atlanta, Inc., Lawrenceville, GA (US)

( * ) Notice: Subject to any disclaimer, the term of this patent is extended or adjusted under 35 U.S.C. 154(b) by 0 days.

(21) Appl. No.: 09/539,632

(22) Filed: Mar. 30, 2000

Related U.S. Application Data

(63) Continuation-in-part of application No. 09/448,101, filed on Nov. 23, 1999, which is a continuation-in-part of application No. 08/987,862, filed on Dec. 9, 1997, now abandoned.

(51) Int. Cl.[7] .................................................... G02B 6/26
(52) U.S. Cl. ........................................................ 385/29
(58) Field of Search ..................... 385/29, 147; 359/341, 359/345; 372/70, 6

(56) References Cited

U.S. PATENT DOCUMENTS

| | | |
|---|---|---|
| 3,729,690 | 4/1973 | Snitzer . |
| 3,808,549 | 4/1974 | Maurer . |
| 4,815,079 | 3/1989 | Snitzer et al. . |
| 4,829,529 | 5/1989 | Kafka . |
| 5,121,460 | 6/1992 | Turninelli et al. . |
| 5,363,463 | 11/1994 | Kleinerman . |
| 5,373,576 | 12/1994 | Minns et al. . |
| 5,485,480 | 1/1996 | Kleinerman . |
| 5,530,709 * | 6/2000 | Waarts et al. ............................. 372/6 |
| 5,533,163 | 7/1996 | Muendel . |
| 5,677,920 * | 10/1997 | Waarts et al. ........................... 372/6 |
| 5,808,518 | 9/1998 | McKinzie, III et al. . |
| 5,867,305 * | 2/1999 | Waarts et al. ......................... 359/341 |
| 5,892,615 | 4/1999 | Grubb et al. . |
| 5,933,271 * | 8/1999 | Waarts et al. ........................ 359/341 |
| 6,081,369 * | 6/2000 | Waarts et al. ........................ 359/341 |

FOREIGN PATENT DOCUMENTS

776074A2    5/1997  (EP) .

OTHER PUBLICATIONS

Wada Akira, "Rare Earth Added Polarization Maintaining Optical Fiber", Nov. 29, 1996, Japanese Patent Abstract # 08313749.

Shirasaki Masataka, "Optical Fiber", Oct. 9, 1985, Japanese Patent Abstract # 60200208.

Fujii Y. and Hussey, D., "Design Considerations for Circularly Form–Birefringent Optical Fibres," IEE Proceedings, vol. 133, Pt. J., No. 4, Aug. 1986, pp. 249.–255.

Snitzer, E. et al., "Double–Clad Offset Core Nd Fiber Laser," Polaroid Corporation, OFC 1988, #PD5–4.

Po, E. et al., "Double Clad High Brightness Nd Fiber Laser Pumped by GaAlAs Phased Array," Polaroid Corporation, OFC 1989, #PD7–1.

\* cited by examiner

*Primary Examiner*—Akm E. Ullah
(74) *Attorney, Agent, or Firm*—Hubert J. Barnhardt, III; Kenneth M. Massaroni; Kelly A. Gardner

(57) ABSTRACT

Systems and methods for suppressing cladding modes at the signal wavelength in an optical fiber system utilizing an optical amplifier without perturbing the pump wavelength. An outer cladding of the gain fiber is removed providing a short section of a single mode fiber that does not guide the higher order modes, thus attenuating the higher order modes. Therefore, this system eliminates unwanted noise. In an embodiment, the modes are filtered at the end of the gain section of the optical fiber before splicing to an input fiber. Hydro florate etching can be utilized to remove the outer cladding. The resulting fiber maintains fundamental mode propagation and no mode mixing occurs while losing the higher order modes eliminating the noise.

32 Claims, 3 Drawing Sheets

NOISE REDUCTION TECHNIQUE FOR CLADDING PUMPED OPTICAL AMPLIFIERS

RELATED APPLICATIONS

This application is a continuation-in-part of U.S. patent application Ser. No. 09/448,101 now pending, entitled "Optical Fiber With Irregularities At Cladding Boundary," filed on Nov. 23, 1999 by Anthon et al., which is a continuation-in-part of U.S. patent application Ser. No. 08/987,862 now abandoned, filed on Dec. 9, 1997 by Anthon et al. and assigned to the assignee hereof.

FIELD OF THE INVENTION

This invention relates to optical fibers used with amplifiers, and, more particularly, to systems and methods of reducing noise in cladding pumped optical amplifiers.

BACKGROUND OF THE INVENTION

Optical amplifiers have gained acceptance for use in fiber optic transmission in telecommunication and cable television systems. The most common form of amplifier is the erbium-doped fiber amplifier, which consists of a singlemode optical fiber with a core doped with erbium atoms. The fiber is generally configured so that a pump beam at a wavelength near 980 or 1480 nanometers propagates in the same doped fiber as a signal beam at a wavelength near 1550 nanometers. The erbium atoms absorb energy from the pump beam and end up in an excited state that provides optical gain at wavelengths near 1550 nanometers. Although these devices are widely used, they only work efficiently with high-brightness singlemode pump sources at wavelengths that coincide with the relatively narrow and weak erbium pump absorption bands. In practical systems, the power achievable in such devices is limited by the pump power obtainable from a laser diode.

A common way of increasing the output power of a laser diode is to increase the emitting area. This makes it possible to increase the power without increasing the power density at the output facet of the device. Unfortunately, the transverse mode structure of the resulting broad-area laser is multimode, and the laser output is no longer sufficiently coherent to be coupled into a single-mode fiber. Such a diode can, however, be coupled into a multimode fiber to provide an essentially incoherent, high power multimode source.

A multimode pump source can be used to excite a singlemode amplifier if the device is built in the form of a cladding-pumped amplifier. In this configuration, a strongly absorbing singlemode core is embedded in a multimode waveguide, typically a glass- or polymer-clad, step-index, multimode optical fiber. The multimode waveguide is configured so that its modes all have overlap with the absorbing core. When pump light is launched into the multimode waveguide, it is attenuated by absorption in the singlemode core, creating a population of excited atoms concentrated in the singlemode core of the fiber. Signal light propagating in the fundamental mode of the singlemode core extracts the energy from the excited atoms, until a large fraction of the energy absorbed from the multimode pump is transferred to the singlemode signal. Such devices were first described in U.S. Pat. No. 3,808,549, to Maurer, issued Apr. 30, 1974, and developed in further detail in U.S. Pat. No. 4,815,079 to Snitzer et al., issued Mar. 21, 1989. The '549 patent describes a fiber where the singlemode and multimode waveguides form a round and concentric double-clad fiber.

The limitations of such a design are described in the '079 patent, where it is described how skew rays in the round waveguide never intersect the absorbing core. The '079 patent, describes other, lower-symmetry multimode waveguide geometries that induce all rays to intersect with the core. More recently, the application "Optical Fiber With Irregularities At Cladding Boundaries," that is incorporated by reference herein, describes how small geometric perturbations of a round, concentric double-clad fiber can be used to produce modes that overlap the absorbing core, to give efficient absorption in a fiber that is mechanically very close to a round, concentric fiber. This application also emphasizes the advantages of using a fiber with an outer cladding layer made from a fluorosilicate glass, as opposed to the polymeric outer cladding used in most of the embodiments in the '079 patent.

A suitable strongly-absorbing core material is the ytterbium-erbium ("Yb, Er") co-doped material described in U.S. Pat. No. 5,225,925, to Grubb et al., issued Jul. 6, 1993. In the optimized fiber disclosed in the '925 patent, energy absorbed by the ytterbium ions is efficiently transferred to the erbium ions. This gives a core material with a much stronger, broader absorption than can be obtained in a singly-doped erbium fiber. The narrow erbium absorption peak near 975 nm is replaced by a ytterbium absorption that extends from at least 900 nm to 1000 nm. Incorporating this core material into a cladding-pumped device and pumping with a multimode source at a nominal wavelength of 950 nm will produce optical gain near 1550 nanometers. A cladding-pumped Yb, Er doped fiber amplifier ("YEDFA") made from this material was demonstrated by Minelly et al. (IEEE Photonics Technology Letters, 5(3), 301–303, 1993), using bulk optics to couple the output of a laser diode array to the double clad fiber. Geometries using fused or reflective couplers similar to those used for conventional single-mode amplifiers have also been used.

Double-clad fibers are not truly single mode fibers, and this has important consequences for the noise properties of amplifiers made from such fibers. In general, there are two types of modes in these fibers: a fundamental mode associated with the "singlemode" core, and a large number of higher-order modes guided by the outer boundary of the multimode waveguide. Mixing between these two types of modes is important because signal light launched into the cladding modes at one point will couple back into the core at a later point with a delay introduced by the differing propagation constants. Interference between the delayed signals gives amplitude fluctuations characterized as multi-path, interferometric noise on the output of the signal beam.

Under ordinary circumstances, there is very little coupling between the two groups of modes, not only because the modes are orthogonal, but also because the propagation constant of the fundamental mode is significantly different from those of the cladding modes. Small effects such as Rayleigh scattering do transfer a small amount of power continuously between modes over the length of the fiber and, in the case of a pumped fiber, spontaneous emission generates optical power in both the core and the cladding. However, these effects are small compared to what happens at the fiber end interfaces where the signal is coupled in and out of the doubleclad fiber through a free-space coupling or a fusion splice. Because of imperfections in the coupling conditions due, for example, to small core misalignments and differences in core compositions, the two groups of modes are much more strongly coupled at these interfaces. Launching a beam from one singlemode fiber into another singlemode fiber, whether by a fusion splice or by some form of free-space coupling, is never 100% efficient, with the "lost" light being coupled to higher order modes. In conventional singlemode fibers these modes are attenuated by a high index polymer applied to the outside diameter of the fiber. This coating prevents total internal reflection at the fiber outer diameter, and the optical power in the higher-order modes is transmitted into the polymer layer where it is dissipated by scattering. This power is not lost in a double-clad fiber, because the outer cladding layer guides both the pump light and the undesired signal light.

While the dominant source of signal power in higher order modes is associated with launch imperfections that occur at the input to the fiber, Rayleigh scattering and spontaneous emission contribute additional signal throughout the entire length of the fiber. An important difference is that the launch imperfections and Rayleigh scattering produce delayed versions of the original signal that can lead to multi-path (coherent) noise, while the spontaneous emission leads to incoherent noise. Light from all three sources can be amplified as it passes through a fiber with gain, so that significant power may be present in the higher order modes at the output of the fiber. Power scattered by launch imperfection generally constitutes the largest contribution.

At the output of the fiber, a conventional singlemode fiber gives a simple, nearly-Gaussian beam with no significant spatial structure. The output of the doubleclad fiber is more complicated. Although the majority of the power is in the singlemode core, there is enough power in higher order modes to produce interference that results in clearly visible fringes on the output beam. This can be readily observed by launching visible light into a doubleclad fiber, or by viewing an infrared output with a suitable viewer. Although the divergence of the beam is similar to that from a singlemode fiber, the detailed structure of the output varies greatly as the fiber is twisted or bent, as would be expected for multimode fiber. Splicing this fiber to another singlemode fiber produces an output that is spatially singlemode, but with the visible spatial structure transformed into intensity modulations that can be readily observed with a photodiode. The relationship of these modulations to the higher order modes is evident because twisting or bending the fiber results in significant amplitude modulation of the singlemode output signal.

It is useful to note that the degree of mixing at a splice is determined by the spatial overlap between each higher order mode and the singlemode core. The higher order modes of a round, concentric doubleclad fiber have very little overlap with the singlemode core. Thus, when singlemode power is launched into a round, concentric doubleclad fiber, the spatial effects noted above are relatively weak, and the noise generated on splicing this fiber to a singlemode fiber is small. The effects are much stronger if a less symmetric shape is used so that nearly all modes overlap the core. Using such less symmetric shapes is highly desirable in cladding pumped amplifiers because it allows efficient pumping; unfortunately it also causes the undesired coupling of the signals between the fundamental and higher order modes at the splices.

A problem with noise arises from cladding modes at the signal wavelength. Power coupled into higher-order modes mixes with the fundamental mode to produce noise. Accordingly, a need exists for systems and methods for an optical fiber for use with an optical amplifier that suppresses cladding modes at the signal wavelength without perturbing the pump wavelength.

SUMMARY OF THE INVENTION

This invention addresses the prior problems and provides for systems and methods of reducing noise arising from cladding modes at the signal wavelength.

In a doubleclad gain fiber, power is coupled from the fundamental modes to higher order modes by imperfections at the input slice or by Rayleigh scattering amplified spontaneous emission. Power produced by these processes propagates essentially unperturbed in higher order modes until the output splice, where splice imperfections and mode mismatches result in a mixture of modes being coupled to the output fiber. The observed noise can thus be treated as a function of the output splice; if it were perfect, there would be no mode mixing and thus, no noise.

With this system, modes only need to be filtered once, at the end of the gain section, where higher order modes, from any source, can be eliminated with a single spatial filter. Filtering at the input to the amplifier eliminates the modes due to the input splice, but contributions from Rayleigh scattering and amplified spontaneous emission will still be present.

In a co-propagating amplifier, the pump is at its weakest at the exit of the amplifier. Almost nothing is lost if the pump is not guided for a few centimeters at the end of the fiber. This is especially true for a power amplifier, where the output signal power is usually large enough to completely bleach any unpumped fiber length. Thus, rather than relying on the splice to be the mode filter, this system includes removing the outer cladding from a short section of fiber, providing a short section of the singlemode fiber that does not guide any of the higher order modes, and thus attenuating all the higher modes.

In one embodiment, the outer cladding is removed from a short section gain fiber using hydrofluoric acid (HF) etching. The etched section is recoated with a high-index acrylate polymer and becomes a singlemode fiber, thereby attenuating all the higher order modes resulting in a low-noise amplifier.

Other objects and advantages of this invention will become apparent to those skilled in the art upon review of this document, the Figures and the claims.

DETAILED DESCRIPTION

FIGS. 1–6 show various aspects of systems and methods for reducing noise arising from cladding modes at the signal wavelength.

Figure 1:
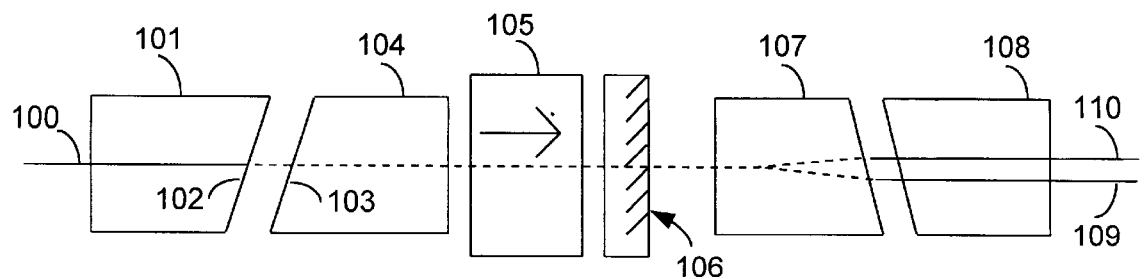
FIG. 1 shows an exemplary view of a hybrid isolator-coupler system showing how the pump and signal wavelengths are combined for coupling into the gain fiber.

FIG. 1 shows an exemplary view of a hybrid isolator-coupler system showing how the pump and signal wavelengths are combined for coupling into the gain fiber. The optical signal is input from the left in fiber 100 which is a conventional singlemode fiber at the signal wavelength of 1550 nanometers. This fiber is mounted in a capillary tube 101 and mounted with its angled endface 102 butted up against the angle-polished endface 103 of the graded refractive index (GRIN) lens 104. The optical signal propagates through the GRIN lens and passes through the optical isolator 105 as a collimated beam. This beam is then incident on the dichroic reflector 106, which transmits the signal wavelength into the GRIN lens 107. The signal beam is then focused towards the two-fiber capillary 108 and onto the singlemode core of fiber 109. Fiber 109 is a doubleclad fiber consisting of a core that is singlemode at the pump and signal wavelengths, surrounded by a concentric multimode waveguide that is large enough in diameter to accommodate the pump beam. In a typical case, the core has a diameter of 5 micrometers and a numerical aperture of 0.12, while the multimode waveguide has a diameter of 90 micrometers and a numerical aperture of 0.22. A 250-micrometer diameter acrylate buffer surrounds the 125-micrometer outside diameter of the fiber, exactly as in conventional singlemode fiber. The second fiber 110 in the capillary is made from the same doubleclad material. The parts are configured so that a multimode pump beam entering from fiber 110 is collected by the GRIN 107, reflected by the dichroic reflector 106 and imaged through the GRIN lens 107 onto the output fiber 109. The coupler thus serves to place the signal and pump beams in a co-propagating configuration in the output fiber 109. This component is equivalent to the isolator-wavelength division multiplexer (IWDM) available, for example, from E-Tek Dynamics, Inc. of San Jose, Calif., model IWDM 980/1550, except that the 5/90/125-doubleclad fibers have replaced the conventional Flexcor 1060 fibers. The singlemode properties of the E-Tek device are identical to those of the device described above, and if fibers that are singlemode at the pump wavelength are spliced as mode filters onto both doubleclad fibers, the device can be aligned in exactly the same way as the singlemode device.

Figure 2:
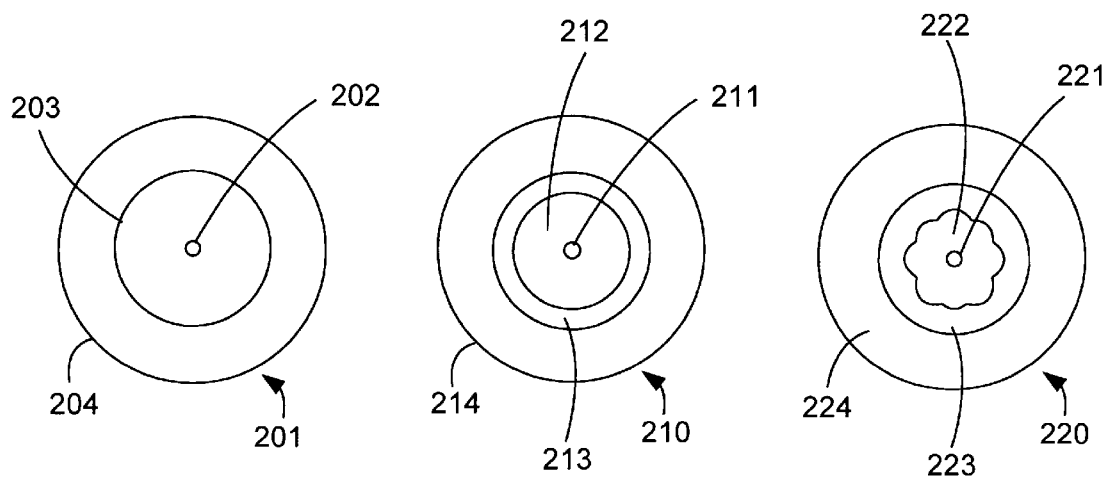
FIG. 2 shows cross-sectional views of the fibers used in FIG. 1.

FIG. 2 shows cross-sectional views of the fibers used in FIG. 1. The conventional optical fiber 201 consists of a core 202, with a diameter of 9 micrometers and a numerical aperture of 0.12. The fiber cladding 203 with a diameter of 125 micrometers is surrounded by a 250-micrometer diameter acrylate buffer 204, both for mechanical protection and to attenuate any power propagating outside of the fundamental mode confined by the core. The doubleclad pump fiber 210 is a doubleclad fiber consisting of a core 211 that is singlemode at the pump and signal wavelengths, embedded in a concentric multimode waveguide 212 that is large enough in diameter to accommodate the pump beam. The waveguide is defined by a region of low-index glass 213, and the fiber is surrounded by a 250-micrometer diameter acrylate buffer 214. In a typical case, the core has a diameter of 5 micrometers and a numerical aperture of 0.12, while the multimode waveguide has a diameter of 90 micrometers and a numerical aperture of 0.22. A 250-micrometer diameter acrylate buffer surrounds the 125-micrometer outside diameter of the outer cladding of the fiber, exactly as in the conventional singlemode fiber. The doubleclad gain fiber 220 has a core 221 with a diameter of 4.5 micrometers and a numerical aperture of 0.20. The core 221 is predominantly fused silica, but it may be doped with a variety of materials including phosphorous and/or cerium, in addition to the active ytterbium and erbium atoms. It is surrounded by a silica waveguide 222 with a scalloped outer boundary, and an average diameter of 85 micrometers. The lower refractive index of the fluorosilicate outer layer 223 results in a numerical aperture of 0.22. As before, a 250 micrometer-diameter acrylate buffer 2240 surrounds the fiber. The optical fiber 220 can be fabricated as disclosed in the application entitled "Optical Fiber with Irregularities At Cladding Boundaries."

Figure 3:
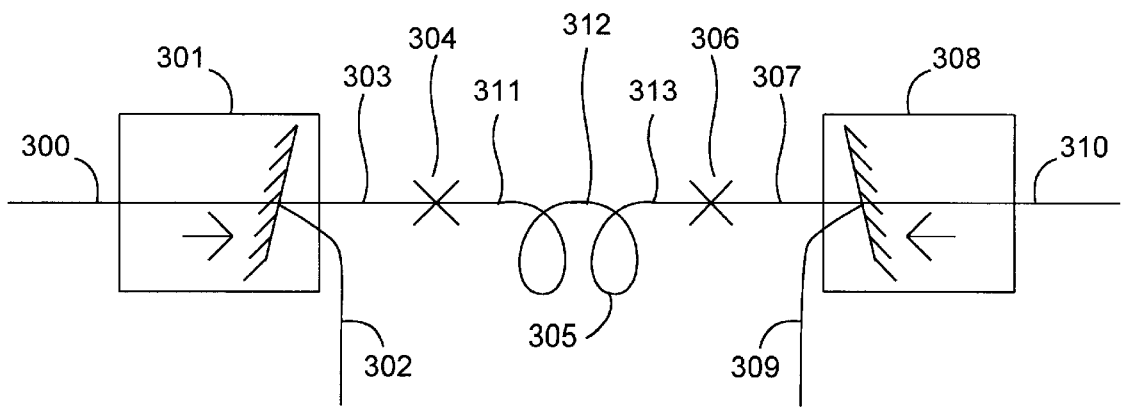
FIG. 3 shows the components of FIG. 1 and FIG. 2 assembled into a bidirectionally pumped amplifier.

FIG. 3 shows how these components are assembled into a bidirectionally pumped amplifier. The signal is incident from fiber 300 on the left and passes through the isolator-coupler 301 where it is combined with the pump light coming from doubleclad fiber 302 and free-space coupled into the concentric doubleclad fiber 303. At this point, a small fraction of the signal power is launched into the cladding rather than the core. The signal and the pump proceed to the right through the fusion splice 304 into the gain fiber 305. The higher order modes of the round concentric fiber 303 have relatively little overlap with the core of the fiber, so relatively little power is coupled from the cladding into the core at this splice. However, because there is significant overlap between the core and the higher order modes of the lower symmetry gain fiber, this splice causes appreciable power to be launched from the core into the higher order modes of the gain fiber. These higher order modes have significant overlap with the singlemode core, but they propagate independently of the signal in the core until reaching the splice 306, where the gain fiber 305 is spliced to another round concentric doubleclad fiber 307. Because of the modal distribution in the gain fiber, there is significant coupling of the higher order modes into the core at this point. The signal in fiber 307 enters the coupler-isolator 308 along with the multimode pump fiber 309. The signal is free-space coupled to the through the right coupler-isolator 308 to the singlemode output fiber 310, while the counter propagating pump is coupled from the doubleclad fiber 309, through fiber 307 to the gain fiber 305.

The noise figure of this type of amplifier can preferably be measured using the RIN subtraction method, described, for example, in P.C. Becker et al., Erbium Doped Fiber Amplifiers, Academic Press, 1999. Unlike the more commonly used optical method, this method is sensitive to noises sources related to multipath effects in the amplifier. If the noise is measured for the amplifier in FIG. 3, it exhibits the characteristics of interferometric noise, particularly a noise figure that varies over timescales of a few minutes. The noise figure is also very sensitive to motion of the gain fiber, consistent with the higher order modes playing a role in the noise performance of the device. These results are consistent with the idea that the splices between the gain fiber and the concentric doubleclad fibers are the main sources of multipath noise in this amplifier. Power is transferred from the core into higher order modes at the splice on the left, and then the higher order modes are remixed into the core at the splice on the right. Once this mixing has occurred, there is no easy way to remove the resulting noise from the output signal. In principle, the problem could be minimized by optimizing the splices, but this appears to be impractical, since the required splice losses would be lower than can usually be obtained with conventional singlemode fibers.

The system and methods of this invention avoid noise issue by attenuating multimode signals before they reach the splice 306 and have the opportunity to mix with a singlemode signal. Its important to selectively attenuate these higher order modes at the signal wavelength while allowing multimode pump radiation originating from either fiber 302 or fiber 309 to pump the entire length of the fiber. This can be done by introducing a wavelength-selective loss that attenuates the signal wavelength continuously through fiber 305, or it can be done by introducing a filter that blocks all higher order modes at both wavelengths, but does so at a point where the pump light is largely depleted.

Figure 4:
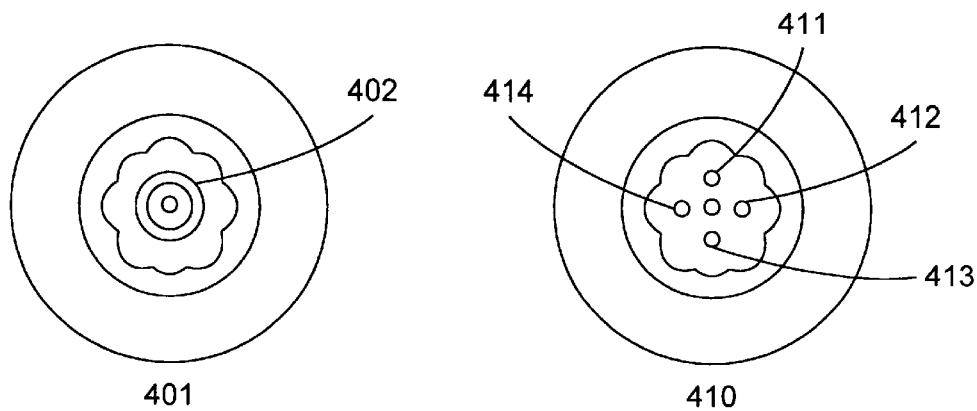
FIG. 4 shows how gain fibers are modified with doped rings or doped regions inserted using rod-in-tube techniques to add absorbers to the fiber that attenuate the higher order modes at the signal wavelength without attenuating the multimode pump wavelength.

Introducing wavelength-selective losses introduced into the outer waveguide of the gain fiber make it possible to attenuate the higher order modes at the signal wavelength without perturbing the propagation of the pump. This would give a case where the unwanted modes would be attenuated uniformly over the length of the gain fiber. FIG. 4 shows a gain fiber 401 where a doped ring 402, concentric with the core has been added to selectively attenuate the higher order modes. FIG. 4 also shows a fiber 410 where the doped regions 411–414 have been inserted using rod-in-tube techniques. In the case of a Yb, Er co-doped fiber, a suitable material is one that absorbs between 1520 and 1600 nm, but which is transparent in the pump region between 900 and 1000 nm. Examples discussed in the previous application entitled "Optical Fiber With Irregularities At Cladding Boundaries," included trivalent terbium and divalent cobalt. However, trivalent terbium is so weakly absorbing that adding enough of the ion to give the desired spectrum is likely to clause the glass to devitrify. Divalent cobalt is more strongly absorbing, but its spectrum is highly dependent on the glass composition. Although favorable spectra have been reported in fused silica host glasses, the spectrum observed in an aluminosilicate glass was not strongly absorbing for wavelengths longer than 1550 nanometers, and also showed some absorption in the pump wavelength region. A third alternative ion is trivalent erbium. This choice of ion is somewhat unexpected because erbium absorbs over most of the 900–1000 nanometer pump wavelength region, and emits spontaneous emission at a wavelength that interferes with the signal. Erbium is usefully transparent in the 900–925 nm region. In addition, the quantum efficiency for erbium emission is reduced by erbium-erbium interactions in the glass, and is small if the erbium concentration is large. The emissions are reduced further if a small fraction of the erbium is replaced by terbium. Erbium is still not ideal because its absorption decreases rapidly for wavelengths longer than 1560 nanometers, but it appears to be more tractable than the other possible dopants. This technique may also be useful with other active ions, where a different (and possibly easier to obtain) set of properties is required for the absorbers.

Another technique for introducing wavelength-dependent losses into the multimode fiber is to use tunneling or frustrated total internal reflection to preferentially couple longer wavelengths out of the waveguide. Using a thin cladding region at the outer boundary of the waveguide, or at the interface with a region of high absorption, can provide appropriate loss. Unfortunately, the transmission of these thin layers depends on both the wavelength of the light and the angle of incidence of the rays. In practice, rays at the pump wavelength (e.g. 950 nanometers) often have higher divergence angles than those the signal wavelength (e.g. 1550 nanometers). As a result, even though the wavelength dependence predicts greater tunneling losses at longer wavelengths, the higher divergence at the shorter wavelength can cause the losses at both wavelengths to be significant.

Using a modal filter that is not wavelength selective is more problematic because the loss must be placed in such a way that the attenuation of the pump power is minimized. The filter must be placed at a point where the pump light is substantially attenuated, and it must be short enough that the length of any unpumped singlemode core is negligible. For the bidirectionally pumped amplifier in FIG. 3, a filter is placed at the midpoint 312 of the gain section so that each pump is absorbed equally, and if the fiber is made long enough, both pumps will be efficiently absorbed. If the counter-propagating pump is eliminated, a filter at 313 will optimize the performance of a co-propagating amplifier. Similarly a filter at 311 will optimize the performance of a counter-propagating device. A suitable filter consists of a short section of the fiber where the low index outer layer has been removed and replaced with a high index material. This gives a section of singlemode fiber in the middle of the doubleclad fiber that acts as a mode filter. A filter length of tens of millimeters is adequately long with respect to eliminating the higher order modes, but negligibly short with respect to the length of unpumped gain fiber. An advantage of using this type of filter to implement this invention is that there is no perturbation of the fiber core at the point where the filtering occurs. The fundamental mode propagation is unperturbed by the loss of the higher order modes, no mode mixing occurs, and the noise can be eliminated.

Figure 5:
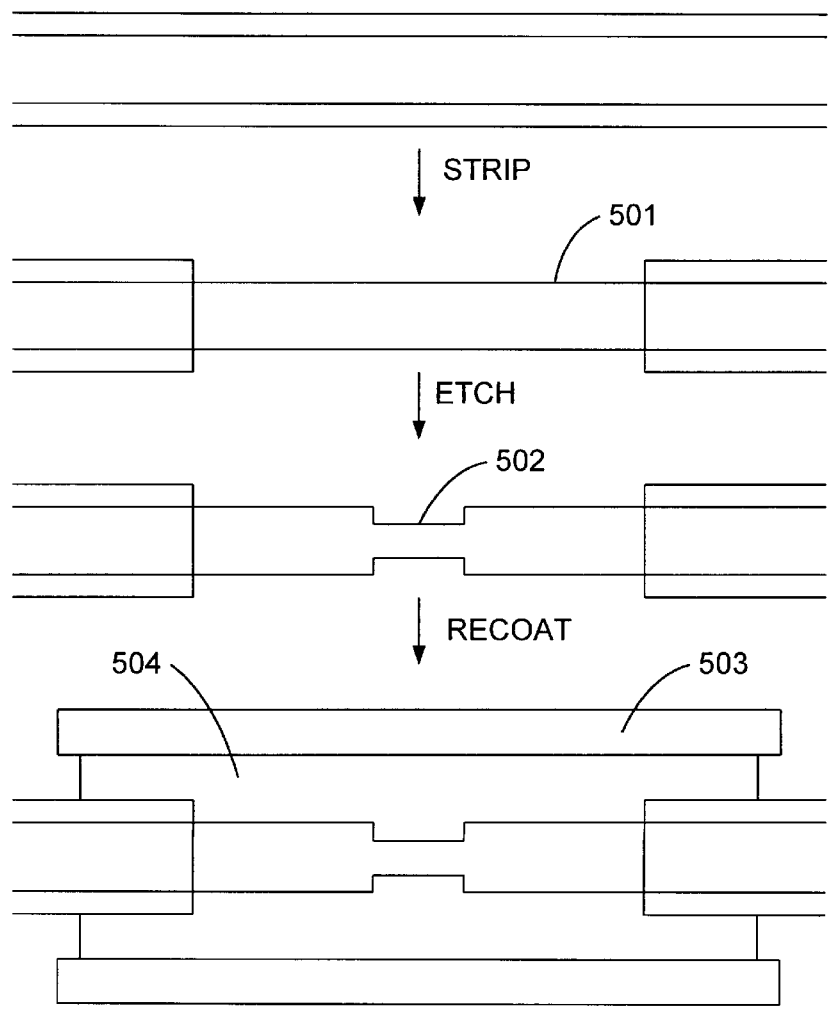
FIG. 5 shows a series of cross-sectional views of an example of a section of the gain fiber stripped, etched and recoated to produce a fiber that eliminates higher order modes at all wavelengths.

An embodiment of this invention for use with a fluorosilicate-clad gain fiber at point 312 of FIG. 3 in a bidirectionally pumped amplifier is shown in FIG. 5. Forming the structure being at the center of the gain fiber, where a section of the acrylate buffer is viewed to expose a section of bare fiber 501 with a length of about 60 millimeters. The silica outer cladding can be removed from a section 502 with a length of 25 millimeters by polishing the outer diameter of the fiber, or it can be removed by etching. Suitable etchants can include, for example hydrofluoric acid. Once the cladding is removed, the fiber is then recoated using a technique similar to that described by J. Kilmer, S. Ciciriello and E. Serafini, "Fusion Splicing for the Loop" Book 4, pp. 257–272, NFOEC, 1993. A polymer capillary tube 503 is placed over the exposed section of the fiber and a high-index photopolymerizable material 504 is injected into the tube to coat the exposed area. After the tube is filled, the polymer is cured with ultraviolet irradiation. A suitable polymer is the DeSolite 950-200 optical fiber splicing compound, made by DSM Desotech, Elgin. Ill., an ultraviolet-curing acrylate resin routinely used for optical fiber recoating. The use of the polymeric tube to contain the high index polymer is preferred over the more conventional recoating techniques that use a mold to match the recoated diameter to the original fiber only because the stripped region is relatively long, and molds longer than 60 millimeters are difficult to obtain.

Figure 6:
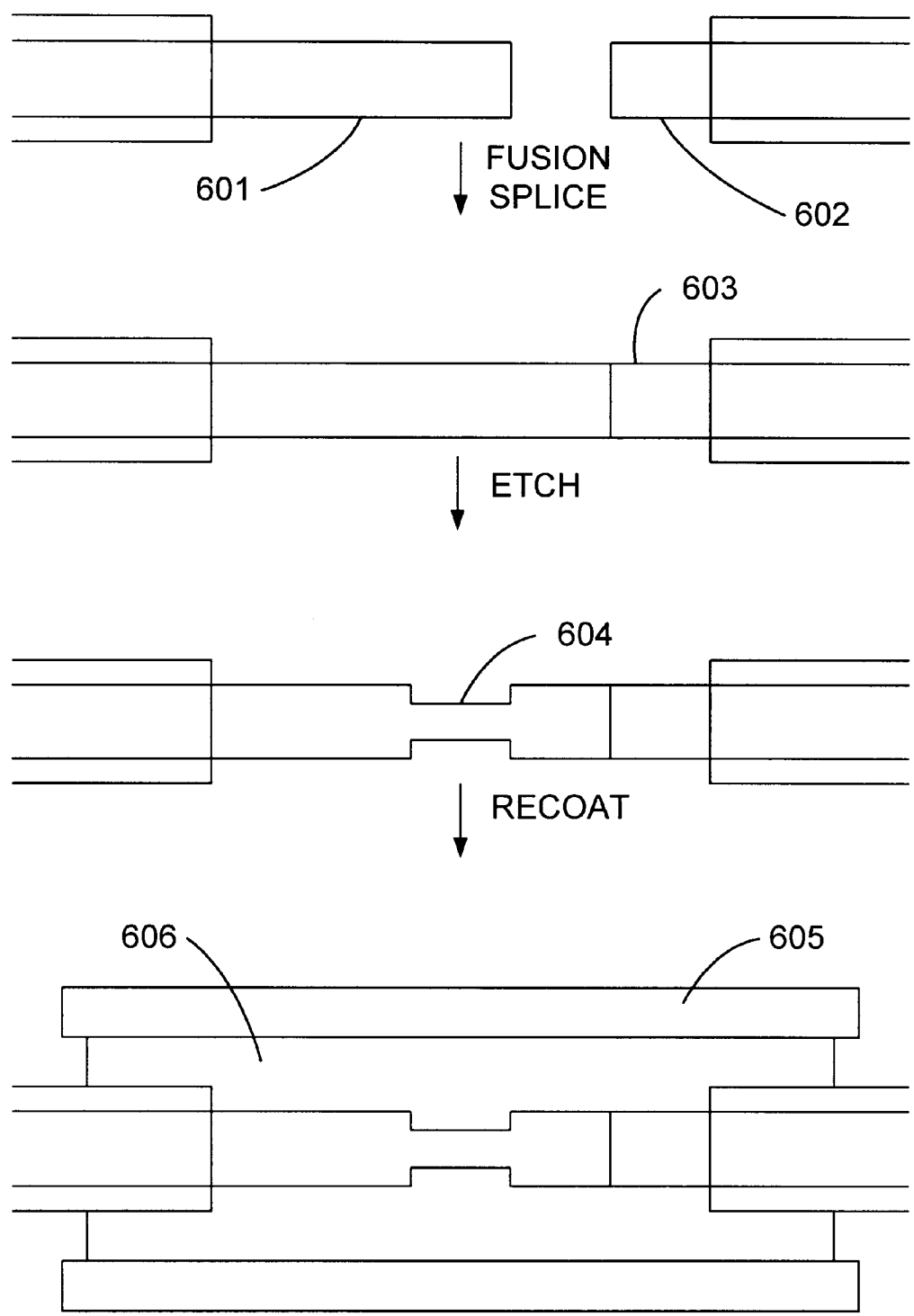
FIG. 6 shows a series of cross-sectional views of an example of how the techniques of FIG. 5 can be advantageously extended in the case that the etched region is immediately adjacent to the fiber output splice.

An embodiment of this invention for use with a fluorosilicate-clad gain fiber at points 311 or 313 of FIG. 3 in a unidirectionally pumped amplifier is shown in FIG. 6. In this case, the etched region is to be positioned at the end of the gain fiber, so it is desirable to incorporate the fusion splice into the recoated region. FIG. 6 shows how the fibers can be stripped 602 and spliced 604 prior to etching 606 and recoating 608. A gain fiber 601 and a singlemode fiber 602 are spliced together at point 603 and etched at the point 604 to remove the outer cladding layer. As before, the fiber is recoated using the polymer sleeve 605 and the high-index polymer 606.

An alternate embodiment encompasses the case where the doubleclad fiber has a polymeric outer cladding. In this case the procedure is just like that shown in FIGS. 5 and 6, except that the fiber buffer 510 is now a low index material like a fluorinated silicone. There is no outer cladding to remove in this case once the polymer is removed; the mode stripping is accomplished by recoating the fiber with the acrylate material without etching the fiber.

In one set of embodiments, one of the pumps in FIG. 3 is eliminated and the modal filter is placed directly adjacent to the splice furthest from the remaining pump. Placing the modal filter adjacent to the output splice at 313 and pumping in a co-propagating geometry from fiber 302 is one possibility; placing the modal filter adjacent to the input splice at 311 and pumping in a counter-propagating geometry from fiber 309 is the other. The counter-propagating geometry tends to be somewhat more efficient, while the co-propagating design gives better noise performance, in part because filtering at the output splice eliminates spontaneous emission and Rayleigh scattering contributions that would not be eliminated by a filter adjacent to the input splice. However, a modal filter placed anywhere between the two splices provides markedly improved noise performance over the results achieved without the filter.

Practicing this system with a bi-directional amplifier involves doubling the fiber length and placing the filter near the center of the fiber at 313. Except for number of isolators, this is exactly equivalent to placing a counter-propagating stage directly after a co-propagating stage. There is generally a penalty for increasing the fiber length. Increasing the length of the fiber increases the number of erbium atoms in the amplifier path, and increases the intrinsic gain (or loss) of the amplifier. In most real devices, the actual maximum gain is limited to about 50 dB by the onset of amplified spontaneous emission. Thus, the fiber length in the amplifier is likely to be the shortest length consistent with efficient pump absorption. At 950 nm the pump absorption is substantially independent of the incident pump power, and the length of fiber required to absorb the pump will be substantially unchanged if the pump and signal powers vary from milliwatts to watts.

In light of the foregoing disclosure of this invention and description of certain preferred embodiments, those who are skilled in this area of technology will readily understand that various modifications and adaptations can be made without departing from the true scope and spirit of this invention. All such modifications and adaptations are intended to be covered by the following claims.

What is claimed is:

1. A method of fabricating a low-noise cladding pumped optical amplifier from a double-clad optical fiber that includes a transparent outer region, a transparent intermediate region with a higher refractive index than the outer region and an inner region with higher refractive index than the intermediate region, where a pump wavelength is absorbed and converted into optical gain at a signal wavelength, the outer and intermediate regions forming a multimode waveguide and the intermediate and inner region forming a waveguide that is embedded in the multimode waveguide and which is singlemode at the signal wavelength, the fiber having an input and an output end, the method comprising:

introducing a selective loss into the fiber, such that only a mode at the signal wavelength that propagates with low loss between the input and output ends of the fiber is a fundamental mode of the singlemode waveguide defined by the inner region of the fiber, and such that a length of the fiber that will not be excited by multimode pump radiation propagating from either the input or output end of the fiber is negligible.

2. The method of claim 1, wherein the selective filter consists of a section of the doubleclad fiber where the outer guiding layer has been stripped away and replaced by a material with a higher refractive index so that only the modes defined by the inner region are guided.

3. The method of claim 2, wherein a length of the stripped region is less than 75 mm and an unpumped region is less than 150 mm.

4. The method of claim 2, wherein the outer region is made from glass.

5. The method of claim 4, wherein the outer region is removed by polishing.

6. The method of claim 4, wherein the outer region is removed by chemical etching.

7. The method of claim 4, wherein the outer region is removed using an etchant containing hydrofluoric acid.

8. The method of claim 2, wherein the outer region is made from an organic polymer.

9. The method of claim 8, wherein the organic polymer is removed using mechanical stripping.

10. The method of claim 2, wherein the material having a higher refractive index used to recoat the stripped region consists of an acrylate resin.

11. The method of claim 10, wherein the acrylate resin is contained inside a polymer capillary tube.

12. The method of claim 2, wherein a pump light is added.

13. The method of claim 2, wherein an interferometric noise is measured.

14. The method of claim 2, wherein a core of the double clad optical fiber is doped with ytterbium and erbium.

15. The method of claim 1, wherein a core of the double clad optical fiber is doped with ytterbium and erbium where the selective filter consists of an erbium doped region embedded in the multimode waveguide but not overlapping with the core.

16. The method of claim 15, wherein terbium is added to the erbium doped region.

17. A double-clad optical fiber, comprising:

a transparent outer region;

an intermediate region with a higher refractive index that the outer region; and an inner region with a higher refractive index than the intermediate region, such that a pump wavelength is absorbed and converted into optical gain at a signal wavelength, the outer and intermediate regions forming a multimode waveguide and the intermediate and inner region forming a waveguide that is embedded in the multimode waveguide and which is singlemode at the signal wavelength, the fiber having an input and an output end, wherein a selective loss is introduced into the fiber, such that only a mode at the signal wavelength that propagates with low loss between the input and output ends of the fiber is a fundamental mode of the singlemode waveguide defined by the inner region of the fiber and the length of the fiber that will not be excited by multimode pump radiation propagating from either the input or output end of the fiber is negligible.

18. The fiber of claim 17, wherein the selective filter consists of a section of the doubleclad fiber where the outer guiding layer has been stripped away and replaced by a material with a higher refractive index so that only the modes defined by the inner region are guided.

19. The fiber of claim 18, wherein a length of the stripped region is less than 75 mm and an unpumped region is less than 150 mm.

20. The fiber of claim 18, wherein the outer region is made from glass.

21. The fiber of claim 20, wherein the outer region is removed by polishing.

22. The fiber of claim 20, wherein the outer region is removed by chemical etching.

23. The fiber of claim 20, wherein the outer region is removed using an etchant containing hydrofluoric acid.

24. The fiber of claim 18, wherein the outer region is made from an organic polymer.

25. The fiber of claim 24, wherein the organic polymer is removed using mechanical stripping.

26. The fiber of claim 18, wherein the material having a higher refractive index used to recoat the stripped region consists of an acrylate resin.

27. The fiber of claim 26, wherein the acrylate resin is contained inside a polymer capillary tube.

28. The fiber of claim 18, wherein a pump light is added.

29. The fiber of claim 18, wherein an interferometric noise is measured.

30. The fiber of claim 18, wherein a core of the double clad optical fiber is doped with ytterbium and erbium.

31. The fiber of claim 17, wherein a core of the double clad fiber is doped with ytterbium and erbium where the selective filter consists of an erbium doped region embedded in the multimode waveguide but not overlapping with the core.

32. The fiber of claim 31, wherein terbium is added to the erbium doped region.

* * * * *